(12) United States Patent
Yoshida

(10) Patent No.: US 10,005,322 B2
(45) Date of Patent: Jun. 26, 2018

(54) PNEUMATIC TIRE

(71) Applicant: SUMITOMO RUBBER INDUSTRIES, LTD., Kobe-shi, Hyogo (JP)

(72) Inventor: Yukishi Yoshida, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 392 days.

(21) Appl. No.: 14/900,344

(22) PCT Filed: Jul. 8, 2014

(86) PCT No.: PCT/JP2014/068143
§ 371 (c)(1),
(2) Date: Dec. 21, 2015

(87) PCT Pub. No.: WO2015/008659
PCT Pub. Date: Jan. 22, 2015

(65) Prior Publication Data
US 2016/0144666 A1    May 26, 2016

(30) Foreign Application Priority Data

Jul. 16, 2013    (JP) ................................. 2013-147843

(51) Int. Cl.
*B60C 11/11*    (2006.01)
*B60C 11/03*    (2006.01)
*B60C 11/12*    (2006.01)

(52) U.S. Cl.
CPC ...... *B60C 11/0332* (2013.01); *B60C 11/0304* (2013.01); *B60C 11/11* (2013.01);
(Continued)

(58) Field of Classification Search
CPC ......... B60C 11/0302; B60C 2011/0383; B60C 2011/0381; B60C 2011/0348; B60C 2011/0344; B60C 2011/0346
(Continued)

(56) References Cited

U.S. PATENT DOCUMENTS

| | | | | |
|---|---|---|---|---|
| 4,258,769 A | * | 3/1981 | Makino | B61C 11/04 152/209.27 |
| 2008/0047641 A1 | * | 2/2008 | Takahashi | B60C 11/0309 152/209.3 |
| 2010/0252159 A1 | * | 10/2010 | Mukai | B60C 11/0302 152/209.25 |

FOREIGN PATENT DOCUMENTS

DE     9417687     * 7/1995
EP     2 689 940 A1    1/2014
(Continued)

*Primary Examiner* — Robert C Dye
(74) *Attorney, Agent, or Firm* — Birch, Stewart, Kolasch & Birch, LLP

(57) ABSTRACT

This pneumatic tire is provided with a center land section demarcated between a pair of center primary grooves extending in a zig-zag shape at a tread section. The center land section is provided with: one center narrow groove extending contiguously in a zig-zag manner in the peripheral direction of the tire at the tire equator; and a plurality of center lug grooves that traverse the center narrow groove from the center primary groove and have a terminus positioned within the center land section. The center lug grooves have: a primary groove section extending from the center primary groove to an apex of the zig-zag of the center narrow groove, and is inclined to one side with respect to the axial direction of the tire; and a sub-groove section extending from an apex of the zig-zag to the terminus and inclined in the reverse direction from the primary groove section.

20 Claims, 5 Drawing Sheets

(52) U.S. Cl.
CPC ... *B60C 11/1259* (2013.01); *B60C 2011/0344* (2013.01); *B60C 2011/0346* (2013.01); *B60C 2011/0348* (2013.01); *B60C 2011/0353* (2013.01); *B60C 2011/0355* (2013.01); *B60C 2011/0365* (2013.01); *B60C 2011/0367* (2013.01); *B60C 2011/0374* (2013.01); *B60C 2011/0381* (2013.01); *B60C 2011/0383* (2013.01); *B60C 2011/1213* (2013.01)

(58) Field of Classification Search
USPC ............ 152/209.27; D12/547, 548, 557–567
See application file for complete search history.

(56) References Cited

FOREIGN PATENT DOCUMENTS

| EP | 3015290 A1 | 5/2016 |
|---|---|---|
| JP | 60-169305 * | 9/1985 |
| JP | 02-045203 * | 2/1990 |
| JP | 6-1113 A | 1/1994 |
| JP | 2003-146020 A | 5/2003 |
| JP | 2004-306906 A | 11/2004 |
| JP | 2012-1716060 A | 9/2012 |
| WO | WO 2012/127839 A1 | 9/2012 |

* cited by examiner

PNEUMATIC TIRE

TECHNICAL FIELD

The present invention relates to pneumatic tires that may improve on-ice performance, steering stability and wear resistance in a well balanced manner.

BACKGROUND ART

Recently, winter tires often have been used not only on icy roads but also on dry roads. Thus, winter tires are requested to have not only sufficient on-ice performance but also an excellent steering stability and wear-resistance on dry roads.

In order to improve on-ice performance, a winter tire having a tread portion provided with a lot of sipes to offer edge effect has been proposed. Unfortunately, such a winter tire may deteriorate in steering performance on dry roads as well as wear resistance due to low rigidity of the tread portion. One of the related arts to the invention is as follows.

CITATION LIST

Patent Literature

Patent Literature 1: Japanese Unexamined Patent Application Publication No. 2003-146020

SUMMARY OF INVENTION

Technical Problem

The present invention has been made in view of the aforementioned circumstances, and has a main object to provide a pneumatic tire that may improve on-ice performance, steering stability and wear resistance in a well balanced manner by basically modifying the configuration of a central portion, a central main groove, a central narrow groove and a sipe while keeping the land ratio of the tread portion in a certain range.

Solution to Problem

The present invention provides a pneumatic tire including a tread portion being provided with a pair of circumferentially and continuously extending central main grooves which are arranged on both sides of a tire equator to form a central portion therebetween, the central portion being provided with a circumferentially extending zigzag central narrow groove on the tire equator with a plurality of zigzag peaks and a plurality of central lug grooves each extending axially inwardly from one of the central main grooves beyond the central narrow groove and having an end within the central portion, and one of the central lug grooves comprising a first portion that extends from the central main groove to one of the zigzag peaks of the central narrow groove with an inclination with respect to an axial direction of the tire and a second portion that extends from the zigzag peak to the end with an opposite inclination to the first portion.

Preferably, in the pneumatic tire in accordance with the present invention, the central lug grooves may include a first central lug groove extending from one of the central main grooves and a second central lug groove extending from the other one of the central main grooves, and the first central lug groove and the second central lug groove may be arranged alternately in a circumferential direction of the tire.

Preferably, in the pneumatic tire in accordance with the present invention, the first portion may have a width increasing axially outwardly and an angle of from 15 to 21 degrees with respect to the axial direction of the tire.

Preferably, in the pneumatic tire in accordance with the present invention, the first portion may have a width at its axially outer end in a range of from 1.10 to 1.20 times of a width at its axially inner end.

Preferably, in the pneumatic tire in accordance with the present invention, each of the central lug grooves may have a width in a range of from 5% to 7% of a pitch of the central lug grooves and a depth in a range of from 30% to 45% of a depth of the central main grooves.

Preferably, in the pneumatic tire in accordance with the present invention, the central narrow groove may have an angle of from 80 to 85 degrees with respect to the axial direction of the tire, a width in a range of from 5% to 9% of a maximum width of the central portion, and a depth in a range of from 30% to 45% of a depth of there central main grooves.

Preferably, in the pneumatic tire in accordance with the present invention, each of the central main grooves may extend in a zigzag manner in a circumferential direction of the tire.

Preferably, in the pneumatic tire in accordance with the present invention, the central portion may have a pair of circumferentially extending edges on its both sides, and an axially maximum width between the edges may be in a range of from 15% to 21% of a tread width.

Preferably, in the pneumatic tire in accordance with the present invention, the central portion may include a maximum portion that has an axially maximum length measure from the tire equator to one of the edges, and a minimum portion that has an axially minimum length measured from the tire equator to the above mentioned edge, and the maximum length may be in a range of from 1.10 to 1.16 times of the minimum length.

Preferably, in the pneumatic tire in accordance with the present invention, the central portion may be provided with a sipe having a depth in a range of from 65% to 75% of a depth of the central main grooves.

Preferably, in the pneumatic tire in accordance with the present invention, a land ratio of the tread portion may be in a range of from 65% to 70%, where the land ratio is defined as a ratio of a total area of a contacting surface of a land portion of the tread portion to a total area of the tread portion obtained by filling up all grooves and sipes on it.

Advantageous Effects of Invention

The central portion is provided with the circumferentially extending zigzag central narrow groove on the tire equator and the plurality of central lug grooves each extending axially inwardly from one of the central main grooves beyond the central narrow groove and having the end within the central portion. The central narrow groove and central lug grooves may offer edge effect in axial and circumferential directions of the tire. Thus, on-ice performance may improve.

One of the central lug grooves includes the first portion that extends from one of the central main grooves to one of the zigzag peaks of the central narrow groove with an inclination with respect to an axial direction of the tire and the second portion that extends from the zigzag peak to the end with an opposite inclination to the first portion. The central lug groove may prevent reduction in rigidity of the central portion. Furthermore, since lateral force due to the first portion and the second portion during traveling straight ahead may be cancelled, straight-traveling stability on icy road may be improved. Accordingly, the pneumatic tire in accordance with the present invention may improve on-ice performance, steering stability and wear resistance in a well balanced manner.

DESCRIPTION OF EMBODIMENTS

Figure 1:
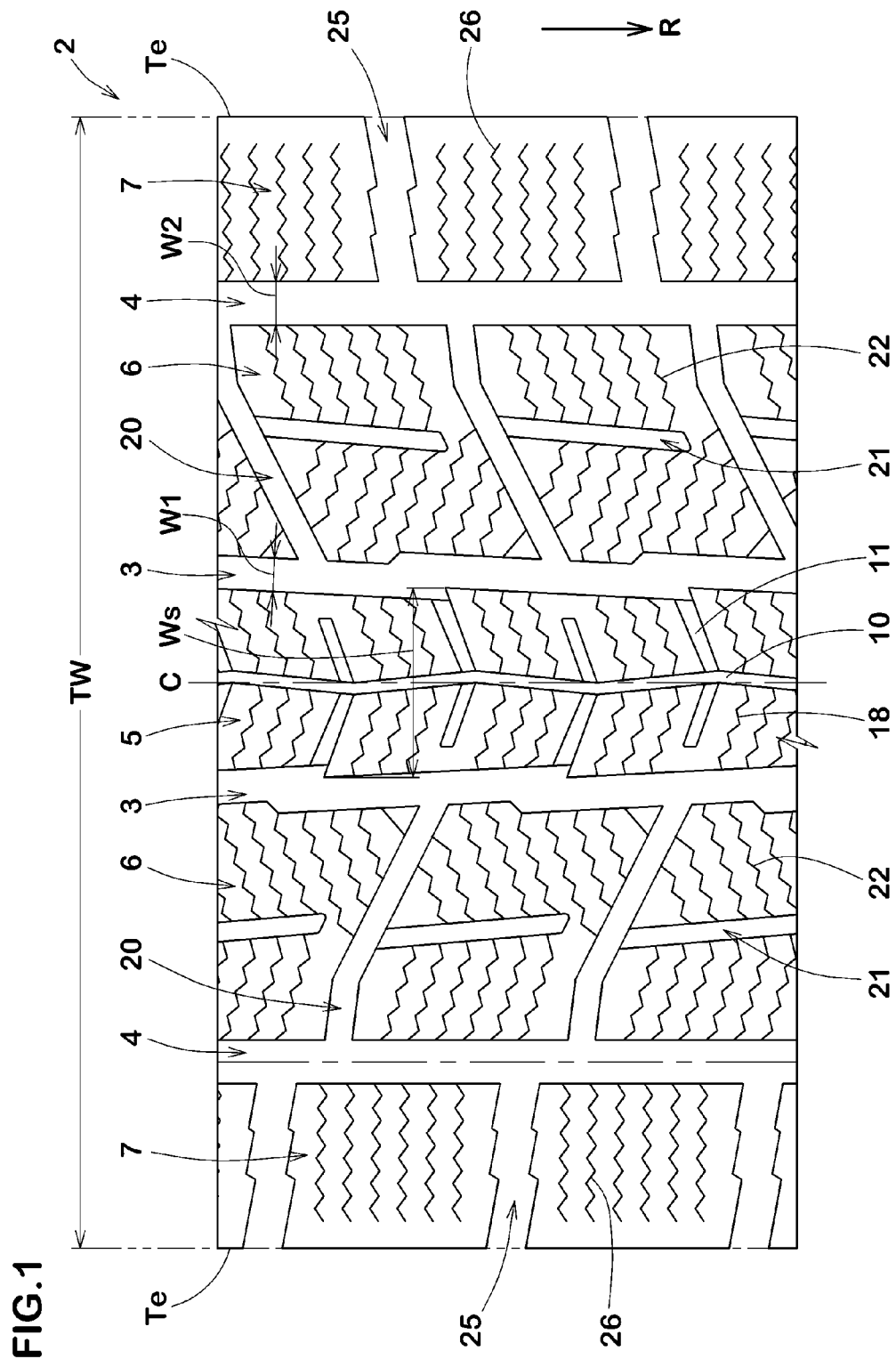
FIG. 1 is a development view of a tread portion in accordance with the present invention.

An embodiment of the present invention will be explained below with reference to the accompanying drawings. As shown in FIG. 1, a pneumatic tire (hereinafter, it may be simply referred to as "tire".) in accordance with the present embodiment may preferably embodied as a winter tire having an asymmetric tread pattern with a designated rotational direction R. The rotational direction R may be identified on a sidewall portion (not shown) using a characters or the like, for example.

In this embodiment, the tire includes a tread portion 2 provided with a pair of circumferentially and continuously extending central main grooves 3 which are arranged on both sides of a tire equator C and a pair of circumferentially and continuously extending shoulder main grooves 4 each of which is arranged axially outward of each central main groove 3. Thus, the tread portion 2 in accordance with the present embodiment is separated into a plurality of land portions that includes a central portion 5 between the pair of central main groove 3 and 3, a pair of middle portions 6 and 6 each of which is formed between the central main groove 3 and the shoulder main groove 4, and a pair of shoulder portions 7 and 7 each of which is formed between the shoulder main groove 4 and a tread edge Te.

The tread edge Te refers to an axially outermost edge of the ground contacting patch which occurs under a normally inflated loaded condition when the camber angle of the tire is zero. The normally inflated loaded condition is such that the tire is mounted on a standard wheel rim with a standard pressure and loaded with a standard tire load. The tread width TW is defined as the axial distance between tread edges Te and Te. In this application, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of a passenger car tire, however, the standard pressure is uniformly defined as 180 kPa.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like. In case of a passenger car tire, however, the standard tire load is uniformly defined as an 88% load of the above-mentioned tire load.

The central main groove 3 extends in a zigzag manner in the circumferential direction of the tire, Such a central main groove 3 may improve traction and braking force on icy roads by offering edge effect in axial and circumferential directions of the tire.

In this embodiment, the shoulder main groove 4 extends in a straight manner along the circumferential direction of the tire. Such a shoulder main groove 4 may improve wear resistance and steering stability by ensuring rigidity of the middle and shoulder portions 6 and 7.

Widths W1 and W2 and depths (not shown) of the main grooves 3 and 4 are not particularly limited but can modify according to the custom. Preferably, the widths W1 and W2 of the main grooves 3 and 4 respectively are in a range of from 2% to 6% of the tread width TW, for example. Here, the above-mentioned widths mean an average groove width that is obtained by dividing the groove area by a groove centerline length. Preferably, the depths of the main grooves 3 and 4 are in a range of from 9.0 to 12.0 mm, for example.

Figure 2:
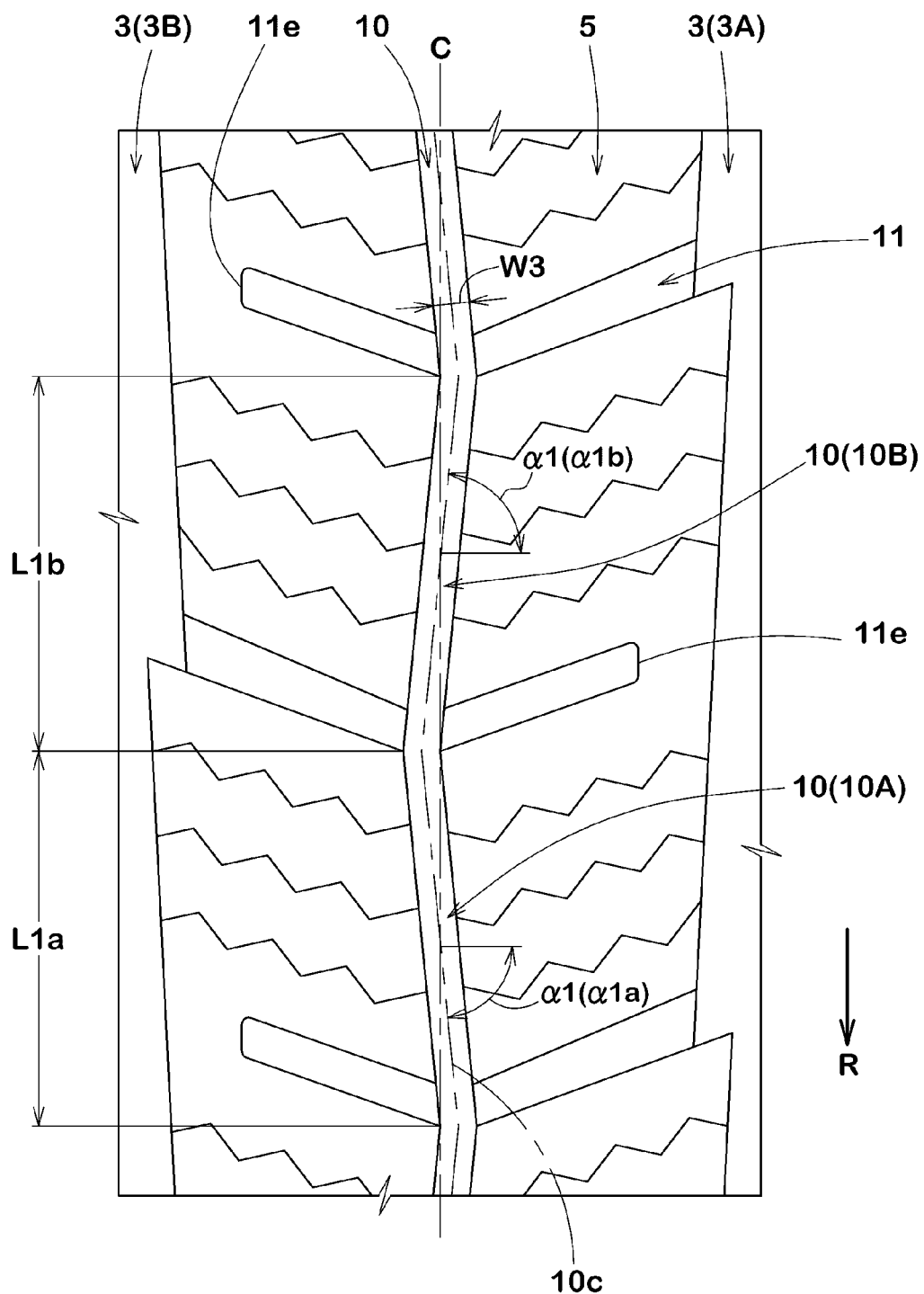
FIG. 2 is an enlarged view of a central portion illustrated in FIG. 1.

FIG. 2 illustrates an enlarged view of the central portion 5 illustrated in FIG. 1. As shown in FIG. 2, the central portion 5 is provided with a circumferentially extending zigzag central narrow groove 10 on the tire equator C and a plurality of central lug grooves 11 each extending axially inwardly from one of the central main grooves 3 beyond the central narrow groove 10 and having an end 11$e$ within the central portion 5. The central narrow groove 10 and the central lug grooves 11 may offer edge effect in axial and circumferential directions of the tire. Thus, on-ice performance may improve.

In this embodiment, the central narrow groove 10 includes a plurality of first inclined portions 10A each of which is inclined upward right as shown in FIG. 2 and a plurality of second inclined portions 10B each of which is inclined upward left as shown in FIG. 2, and which are alternately arranged in the circumferential direction of the tire.

In this embodiment, the first inclined portion 10A and the second inclined portion 10B have the same angles $\alpha 1a$ and $\alpha 1b$ respectively, and have the same circumferential lengths L1$a$ and L1$b$ respectively. Thus, the central portion 5 may preferably be balanced in rigidity with respect to the tire equator C. Preferably, the lengths L1$a$ and L1$b$ of the first and second inclined portions 10A and 10B respectively are set in a range of not less than 60% but preferably not more than 75% of an axially maximum width Ws (shown in FIG. 1) of the central portion 5.

When an angle $\theta 1$ of the central narrow groove 10 is less than 80 degrees with respect to the axial direction of the tire, edge effect thereof against the axial direction of the tire tends to deteriorate. Furthermore, the angle $\theta 1$ of the central narrow groove 10 is more than 85 degrees with respect to the axial direction of the tire, edge effect thereof against the circumferential direction of the tire tends to deteriorate. In view of above, the angle $\theta 1$ of the central narrow groove 10 is preferably in a range of not less than 80 degrees, more preferably not less than 81 degrees, but preferably not more than 85 degrees, more preferably not more than 84 degrees. The angle θ1 of the central narrow groove 10 is defined using the groove centerline of the central narrow groove 10.

When the width W3 of the central narrow groove 10 is less than 5% of the maximum width Ws of the central portion 5, it may be difficult to discharge the ice introduced in the groove, and therefore on-ice performance may deteriorate. When the width W3 of the central narrow groove 10 is more than 9% of the maximum width Ws of the central portion 5, steering stability and wear resistance may deteriorate due to lowering in rigidity of the central portion 5. Accordingly, the width W3 of the central narrow groove 10 is preferably in a range of not less than 5% of the maximum width Ws of the central portion 5, more preferably not less than 6%, but preferably not more than 9% of the maximum width Ws of the central portion 5, more preferably not more than 8%. Note that the width W3 is measured as a width which is perpendicular to a longitudinal direction of the groove centerline. The central lug groove width described later is also measured in the same manner.

In order to further improve the advantageous effects described above, the depth (not shown) of the central narrow groove 10 is preferably set in a range not less than 30%, more preferably not less than 35%, but preferably not more than 45%, more preferably not more than 40% of that of the central main groove 3.

Figure 3:
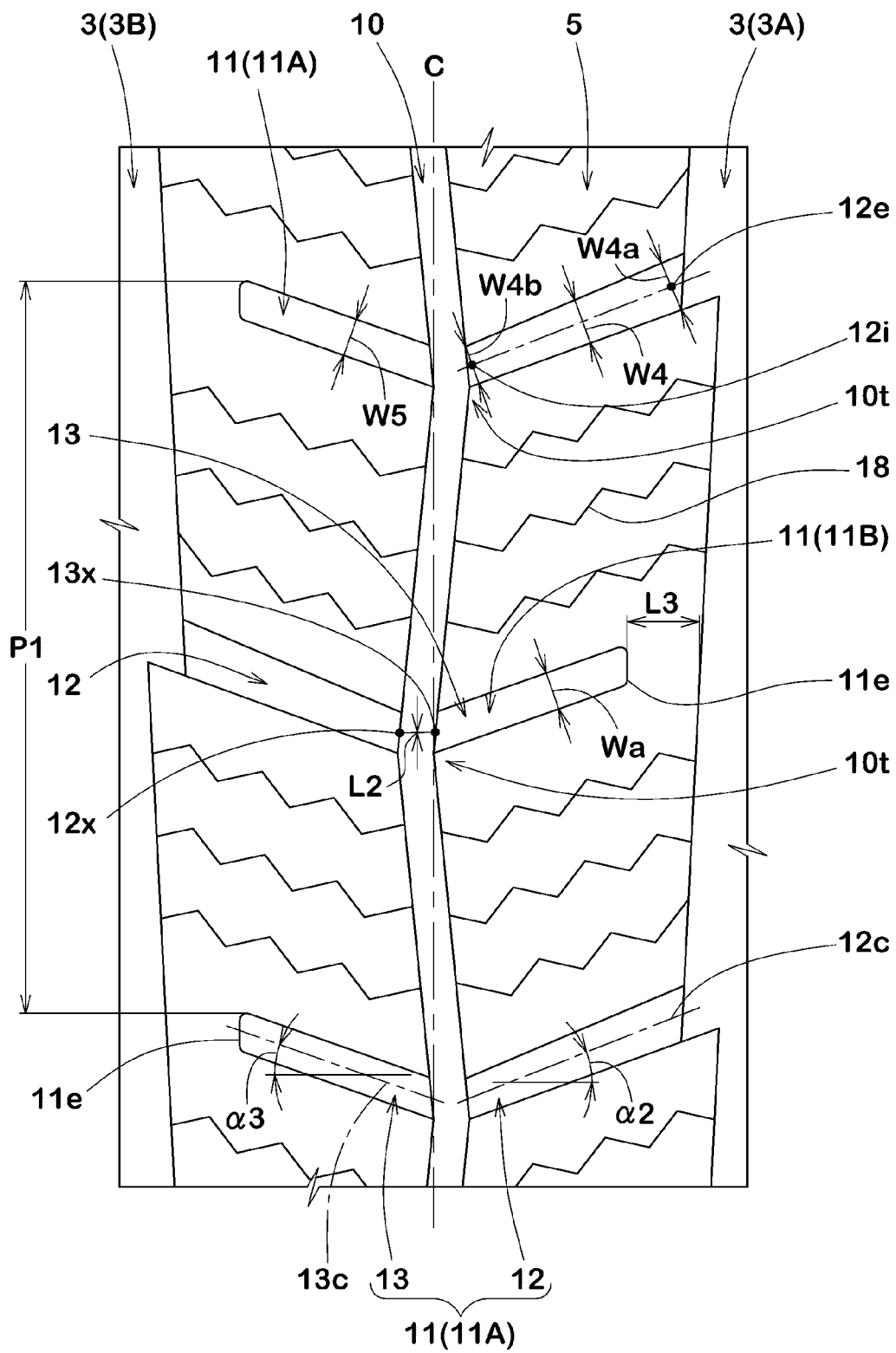
FIG. 3 is an enlarged view of the central portion illustrated in FIG. 1.

As shown in FIG. 3, the central lug grooves 11, for example, include a first central lug groove 11A extending from one of the central main grooves 3 (the right side central main groove 3A in FIG. 3) and a second central lug groove 11B extending from the other one of the central main grooves 3 (the left side central main groove 3B in FIG. 3). The first central lug groove 11A and the second central lug groove 11B are alternately arranged in the circumferential direction of the tire. Thus, rigidity of the central portion 5 may be balanced.

In this embodiment, each central lug groove 11 includes a first portion 12 that extends from the central main groove 3 to one of the zigzag peaks 10t of the central narrow groove 10 with an inclination with respect to an axial direction of the tire and a second portion 13 that extends from the zigzag peak 10t to the end 11e with an opposite inclination to the first portion 12. The central lug groove 11 may prevent reduction in rigidity of the central portion 5. Furthermore, since lateral force due to the first portion 12 and the second portion 13 during traveling straight ahead may be cancelled, straight traveling stability on icy road may be improved.

The first portion 12 in accordance with the present embodiment is inclined backwardly with respect to the rotational direction R from the tire equator C axially outwardly. Thus, when straight traveling ahead, the ice introduced in the first portion 12 may smoothly be dispersed to the central main groove 3. Accordingly, on-ice performance may improve.

When the first portion 12 has an angle α2 being less than 15 degrees with respect to the axial direction of the tire, it may be difficult not only to smoothly discharge the ice introduced in the groove outwardly during straight traveling ahead but also to offer sufficient edge effect against the axial direction of the tire. When the angle α2 of the first portion 12 is more than 21 degrees, it may be difficult not only to smoothly discharge the ice introduced in the groove outwardly during cornering but also to offer sufficient edge effect against the circumferential direction of the tire. Accordingly, the first portion 12 preferably has the angle α2 in a range of from not less than 15 degrees, more preferably not less than 16 degrees, but preferably not more than 21 degrees, more preferably not more than 20 degrees. The angle α2 is defined using its groove centerline 12c.

In this embodiment, the first portion 12 has a width W4 gradually increasing axially outwardly. Due to this, the ice introduced in the first portion 12 may further smoothly be discharged to the central main groove 3.

When the first portion 12 has a width W4a at its axially outer end 12e being less than 1.10 times of a width W4b at its axially inner end 12i, it may be difficult to smoothly discharge the ice introduced in the first portion 12. When the width W4a at its axially outer end 12e of the first portion is more than 1.20 times of the width W4b at its axially inner end 12i of the first portion 12, rigidity of the central portion 5 may deteriorate. In view of above, the first portion 12 has the width W4a at its axially outer end 12e is preferably in a range of from 1.10 to 1.20 times the width W4b at its axially inner end 12i. Furthermore, the axially outer end 12e of the first portion 12 is defined as the location where the width W4 of the first portion 12 perpendicular to the groove centerline 12c is maximum, and the axially inner end 12i of the first portion 12 is defined as the location where the width W4 perpendicular to the groove centerline 12c is minimum.

The second portion 13 in accordance with the present embodiment has a substantially constant width W5. Such a second portion 13 may ensure rigidity of the central portion 5.

Preferably, the width W5 of the second portion 13 is set in a range of not less than 70%, more preferably not less than 75%, but preferably not more than 110%, more preferably not more than 105% of the width W4b at its inner end 12i of the first portion 12. Thus, the ice introduced in the second portion 13 may smoothly be discharged to the first portion 12.

Similarly, a circumferential distance L2 between the center point 13x of the circumferential width of the second portion 13 at the central narrow groove 10 and the center point 12x of the circumferential width of the first portion 12 at the central narrow groove 10 is preferably in a range of not more than 10%, more preferably not more than 5% of the width W4b of the inner end 12i of the first portion 12.

Preferably, the second portion 13 has an angle α3 with respect to the axial direction of the tire which is substantially same as the angle α2 of the first portion 12. Thus, lateral force due to the second portion 13 and the first portion 12 may effectively be cancelled, thereby improving straight-traveling stability. The angle α3 of the second portion 13 is defined using the groove centerline 13c of the second portion 13. Furthermore, the above-mentioned "substantially same" should be understood so as to include the aspect in which the difference between the α3 of the second portion 13 and the angle α2 of the first portion 12 is within 5 degrees.

The central lug groove 11 has a width Wa, which is average width of those of the first portion 12 and the second portion 13, is preferably in a range of from 5% to 7% of a pitch P1 of the central lug grooves 11. Thus, rigidity of the central portion 5 and void of the central lug groove 11 may be ensured, thereby improving on-ice performance, steering stability and wear resistance in a well balanced manner.

In the same point of view, the central lug groove 11 has a depth (not shown) in a range of not less than 30%, more preferably not less than 35%, but preferably not more than 45%, more preferably not more than 40% of the depth of the central main groove 3.

The end 11e of the central lug groove 11 is separated in an axial distance L3 from the central main groove 3. The distance L3 is preferably in a range of not less than 8%, more preferably not less than 10%, but preferably not more than 22%, more preferably not more than 20% of the maximum width Ws (shown in FIG. 1) of the central portion 5. Thus, axial rigidity and edge effect of the central portion 5 may be ensured.

Figure 4:
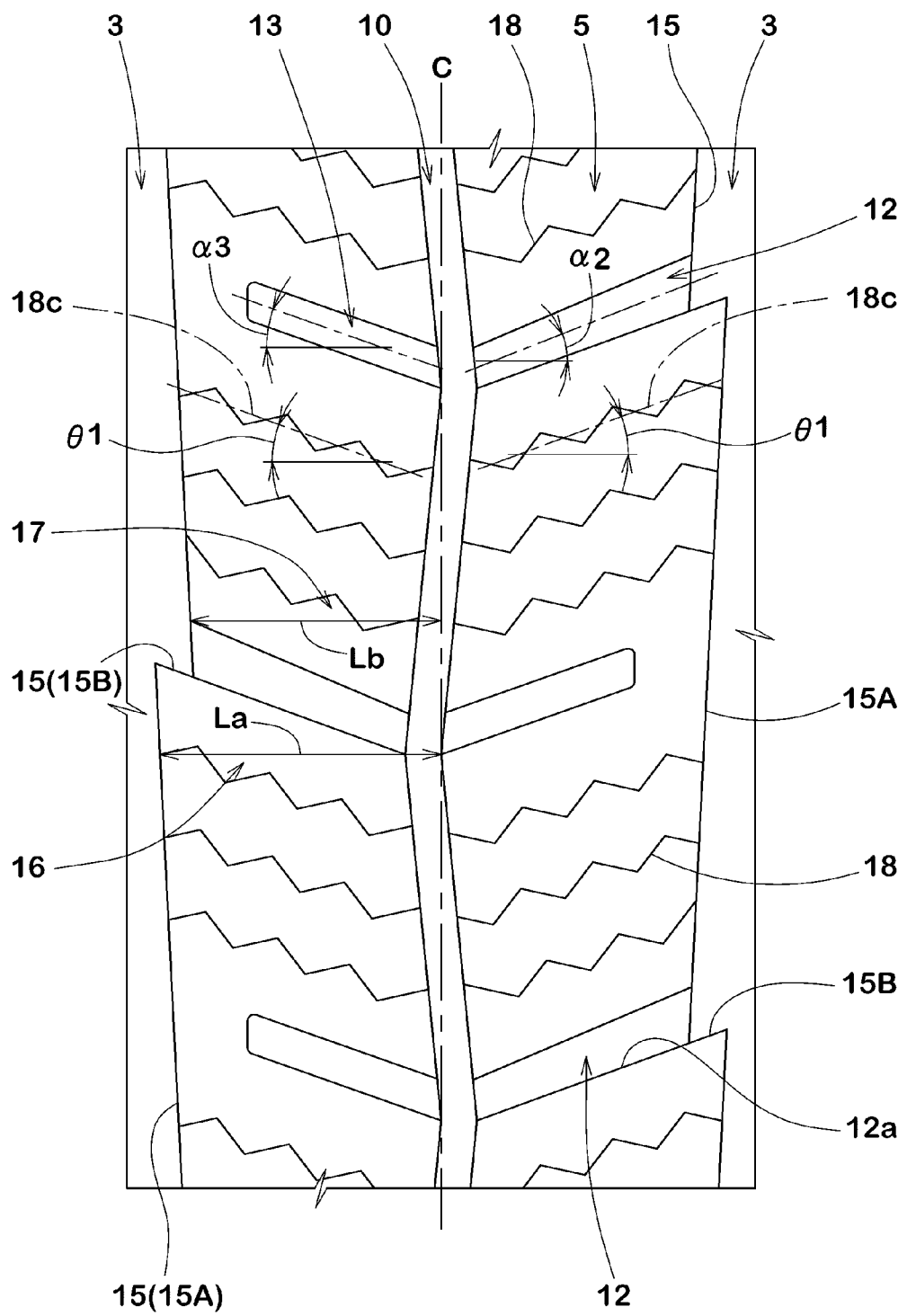
FIG. 4 is an enlarged view of the central portion illustrated in FIG. 1.
Figure 5:
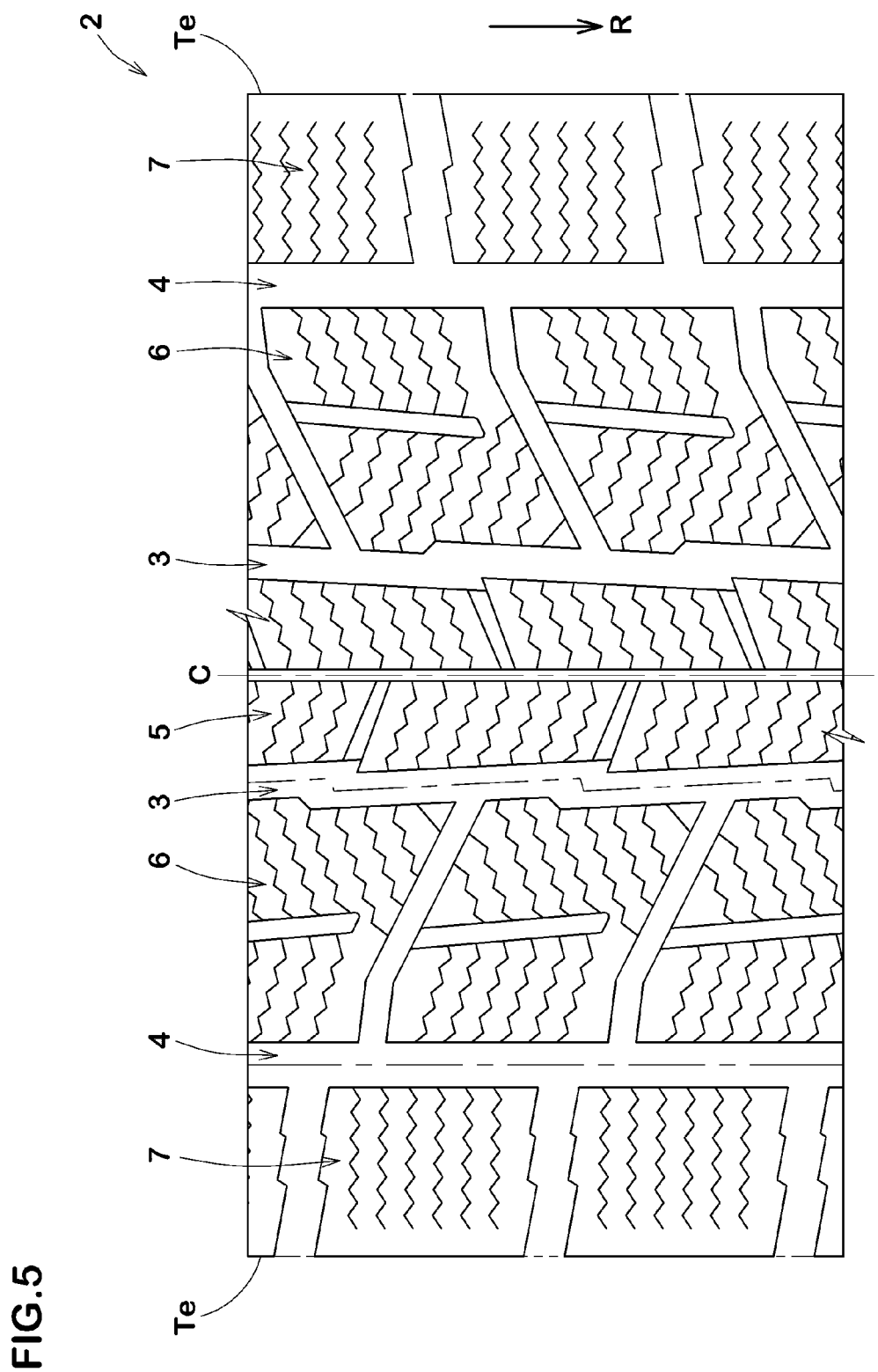
FIG. 5 is a development view of a tread portion in accordance with a conventional example.

As shown in FIG. 4, the central portion 5 has a pair of circumferentially extending edges 15 on its both sides. Each of the edges 15 includes a plurality of straightly extending long elements 15A having a small inclination with respect to the circumferential direction of the tire and a plurality of short segments 15B each arranged between the long elements 15A and 15A. Such an edge 15 may improve circumferential rigidity.

In this embodiment, each of the short segments 15B is connected to a groove edge 12a of the first portion 12 linearly. Thus, the central portion 5 may be ensured in high rigidity.

The central portion 5 includes a maximum portion 16 that has an axially maximum length measured from the tire equator C to one of the edges 15, and a minimum portion 17 that has an axially minimum length measured from the tire equator C to the above mentioned edge 15. Here, the maximum portion 16 and the minimum portion 17 are defined in a region where the central lug groove 11 is not provided between the tire equator C and the edge 15.

The axially maximum length La of the maximum portion 16 is preferably in a range of not less than 1.10 times, more preferably not less than 1.12 times, but preferably not more than 1.16 times, more preferably not more than 1.14 times of the axially minimum length Lb of the minimum portion 17. When the axially maximum length La of the maximum portion 16 is more than 1.16 times of the axially minimum length Lb of the minimum portion 17, circumferential rigidity of the central portion 5 may deteriorate. On the other hand, when the axially maximum length La of the maximum portion 16 is less than 1.10 times of the axially minimum length Lb of the minimum portion 17, edge effect against the circumferential direction of the tire may deteriorate.

The central portion 5 is provided with at least one sipe 18. Preferably, the sipe 18 has a depth (not shown) in a range of not less than 65%, more preferably not less than 68%, but preferably not more than 75%, more preferably not more than 72% of the depths of the central main grooves 3. When the depth of the sipe 18 is less than 65% of the depths of the central main grooves 3, edge effect thereof may deteriorate. When the depth of the sipe 18 is more than 75% of the depths of the central main grooves 3, rigidity of the central portion 5 may deteriorate, thereby deteriorating wear resistance as well as steering stability.

The sipe 18 in accordance with the present embodiment is embodied as an open ended type with both ends communicating the central main groove 3 with the central narrow groove 10. Furthermore, the sipe 18 in accordance with the present embodiment extends in a zigzag manner. Such a sipe 18 may offer excellent edge effect. The sipe 18 is not particularly limited to this aspect, but may be embodied as a straight manner or wavy manner. In addition, the sipe 18 may be embodied as a semi-opened or closed type.

Preferably, the sipe 18 extends at an angle θ1 with respect to the axial direction of the tire being substantially same as the angle α2 of the first portion 12 or the angle α3 of the second portion 13. Thus, rigidity of the central portion 5 may be ensured to improve wear resistance and steering stability. The angle θ1 of the sipe 18 in accordance with the present embodiment is defined as an angle between the zigzag amplitude centerline 18c of the sipe and the axial line of the tire. Here, the above-mentioned "substantially same" should be understood so as to include the aspect in which the difference between the angle α2 of the first portion 12 and the angle θ1 of the sipe 18 or the difference between the angle α3 of the second portion 13 and the angle θ1 of the sipe 18 is within 5 degrees.

The maximum width Ws of the central portion 5 between edges 15 and 15 is preferably in a range of not less than 15%, more preferably not less than 17%, but preferably not more than 21%, more preferably not more than 19% of the tread width TW. When the maximum width Ws of the central portion 5 between edges 15 and 15 is less than 15% of the tread width TW, rigidity of the central portion 5 may deteriorate and thereby straight traveling stability on icy road tends to deteriorate. When the maximum width Ws of the central portion 5 between edges 15 and 15 is more than 21% of the tread width TW, rigidity of the middle and shoulder portions 6 and 7 may deteriorate and thereby steering stability tends to deteriorate.

As shown in FIG. 1, the middle portion 6 is provided with a plurality of middle lateral grooves 20 communicating the central main groove 3 with the shoulder main groove 4, a plurality of middle narrow grooves 21 each extending from each middle lateral groove 20 and terminating without reaching the adjacent next middle lateral groove 20, and a plurality of middle sipes 22.

Each of the middle lateral groove 20 extends backwardly of the rotational direction R from the central main groove 3 to the shoulder main groove 4. The middle lateral groove 20 may improve on-ice performance by discharging the ice introduced therein using tire rotation.

Each of the middle narrow grooves 21 extends forward of the rotational direction R (bottom side of FIG. 1) and axially inwardly from each middle lateral groove 20 toward the adjacent next middle lateral groove 20 without reaching thereto. Thus, the ice introduced in the middle narrow groove 21 is also discharged to the shoulder main groove 4 through the middle lateral groove 20.

The middle sipe 22 in accordance with the present embodiment is embodied as an open-ended type communicated with the central main groove 3, the shoulder main groove 4, the middle lateral groove 20 or the middle narrow groove 21. The middle sipe 22 may improve on-ice performance.

The shoulder portion 7 is provided with a plurality of shoulder lateral grooves 25 communicating the shoulder main groove 4 with the tread edge Te, and a plurality of semi-opened shoulder sipes 26 each extending from the shoulder main groove 4 and terminating within the shoulder portion 7.

In this embodiment, each of the shoulder lateral grooves 25 extends in a zigzag manner. Such a shoulder lateral groove 25 may offer edge effect in various directions.

Each of the shoulder sipe 26 extends in a zigzag manner. Thus, on-ice performance may further be improved.

Preferably, the tread portion 2 in accordance with the present embodiment may have a land ratio in a range of from 65% to 70%. When the land ratio is less than 65%, steering stability and wear resistance may deteriorate. When the land ratio is more than 70%, since widths of the respective grooves tend to be narrow, it may be difficult to discharge the ice introduced in the grooves. The land ratio is defined as a ratio of a total area Mb of contacting surfaces of all land portions 5, 6 and 7 to a total area Ma of the tread portion 2 which is obtained by filling up all grooves 3, 4, 10, 11, 20 and 21, and sipes 12, 22 and 26 on the tread portion 2.

While the particularly preferable embodiments of the invention have been described in detail, the present invention is not limited to the illustrated embodiments, but can be modified and carried out in various aspects.

EXAMPLE

In order to confirm advantageous effects of the invention, pneumatic tires of 225/65R17 having the basic tread pattern shown in FIG. and specifications based on Table 1 were tested. The respective groove widths and angles are as show in FIG. 1 except grooves listed on Table 1. The common specifications and test procedures are as follows.
Tread width TW: 18.0 mm
Central main groove depth: 4.0 mm
Shoulder main groove depth: 11.0 mm
Middle lateral groove depth: 11.0 mm
Middle narrow groove depth: 9.0 mm
Shoulder lateral groove depth: 11.0 mm
Sipe depth on central portion to depth of central main groove: 70%
Maximum portion axial length to minimum portion axial length: 1.12
Maximum width of central portion to TW: 20%
Land ratio: 67%
Steering Stability:

Each test tire was installed on all wheels of a four-wheel drive vehicle with a 2,400 cc displacement based on the following condition. Then, a test driver made to run the test vehicle on an asphalt road of a test course and evaluated traveling performance such as steering response, rigid feeling and grip by his feeling. The test results are indicated using a score based on Ex. 1 being 100. The larger the value, the better the performance is.
Rim size (all wheels): 17×6.5 J
Internal pressure (all wheels): 210 kPa
On-Ice Performance:
The test driver made to run the above mentioned test vehicle on an icy road (frozen road) of a test course and evaluated the traveling performance such as steering response during cornering and straight traveling, rigid feeling and grip by his feeling. The test results are indicated using a score based on Ex. 1 being 100. The larger the value, the better the performance is.
Wear Resistance:
The test driver made to run the above mentioned test vehicle on an asphalt road of a test course for 8,000 km. After traveling, the amount of remaining depth of the central main grooves was measured at eight locations in the circumferential direction of the tire. The test results are indicated the average remaining depth using an index based on Ex. 1 being 100. The larger the value, the better the performance is.
Teat results were shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| First portion angle α2 (deg.) | 18 | 18 | 13 | 15 | 21 | 23 | 18 | 18 | 18 | 18 | 18 | 18 | 18 |
| Central narrow groove angle α1 (deg.) | 90 | 83 | 83 | 83 | 83 | 83 | 78 | 80 | 85 | 87 | 83 | 83 | 83 |
| Central narrow groove width W3/ maximum width Ws of central portion | 7 | 7 | 7 | 7 | 7 | 7 | 7 | 7 | 7 | 7 | 3 | 5 | 9 |
| Central narrow groove depth/central main groove depth | 40 | 40 | 40 | 40 | 40 | 40 | 40 | 40 | 40 | 40 | 40 | 40 | 40 |
| Central lug groove width Wa/central lug grooves pitch P1 | 6 | 6 | 6 | 6 | 6 | 6 | 6 | 6 | 6 | 6 | 6 | 6 | 6 |
| central lug groove depth/central main groove depth | 40 | 40 | 40 | 40 | 40 | 40 | 40 | 40 | 40 | 40 | 40 | 40 | 40 |
| Steering stability (Score) * | 90 | 100 | 90 | 90 | 90 | 89 | 90 | 95 | 95 | 97 | 100 | 97 | 95 |
| On-ice performance (Score) * | 80 | 100 | 97 | 98 | 95 | 92 | 102 | 100 | 97 | 95 | 90 | 95 | 95 |
| Wear resistance (Index) * | 95 | 100 | 105 | 100 | 95 | 93 | 95 | 97 | 97 | 95 | 100 | 95 | 95 |

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|
| First portion angle α2 (deg.) | 18 | 18 | 18 | 18 | 18 | 18 | 18 | 18 | 18 | 18 | 18 | 18 | 18 |
| Central narrow groove angle α1 (deg.) | 83 | 83 | 83 | 83 | 83 | 83 | 83 | 83 | 83 | 83 | 83 | 83 | 83 |
| Central narrow groove width W3/ maximum width Ws of central portion | 12 | 7 | 7 | 7 | 7 | 7 | 7 | 7 | 7 | 7 | 7 | 7 | 7 |
| Central narrow groove depth/central main groove depth | 40 | 25 | 30 | 45 | 50 | 40 | 40 | 40 | 40 | 40 | 40 | 40 | 40 |
| Central lug groove | 6 | 6 | 6 | 6 | 6 | 3 | 5 | 7 | 9 | 6 | 6 | 6 | 6 |

TABLE 1-continued

| | | | | | | | | | | | | | |
|---|---|---|---|---|---|---|---|---|---|---|---|---|---|
| width Wa/central lug grooves pitch P1 | | | | | | | | | | | | | |
| central lug groove depth/central main groove depth | 40 | 40 | 40 | 40 | 40 | 40 | 40 | 40 | 40 | 25 | 30 | 45 | 50 |
| Steering stability (Score) * | 90 | 100 | 97 | 95 | 93 | 102 | 96 | 94 | 93 | 102 | 100 | 97 | 90 |
| On-ice performance (Score) * | 95 | 90 | 93 | 97 | 95 | 90 | 95 | 95 | 96 | 90 | 95 | 97 | 95 |
| Wear resistance (Index) * | 90 | 100 | 97 | 95 | 90 | 102 | 97 | 94 | 90 | 102 | 100 | 97 | 90 |

* The larger the value, the better the performance is.

From the test results, it was confirmed that example tires had been significantly improved in on-ice performance, steering stability and wear resistance as compared with the reference. In addition, other tests were conducted using test tires having different specifications falling within and outside the preferable ranges described above with respect to depths of grooves and/or sipes, the maximum width of the central portion, the ratio of the axial length of the maximum portion to the axial length of the minimum portion, and the land ratio. The test results using the tires falling within the preferable ranges were the same as the results shown in Table 1, and were superior to the test results for the tire outside the preferable ranges.

REFERENCE SIGNS LIST

2 Tread portion
3 Central main groove
5 Central portion
10 Central narrow groove
11 Central lug groove
11e End of central lug groove
12 First portion
13 Second portion
C Tire equator

The invention claimed is:

1. A pneumatic tire comprising:
   a tread portion being provided with a pair of circumferentially and continuously extending central main grooves which are arranged on both sides of a tire equator to form a central portion therebetween;
   the central portion being provided with a circumferentially extending zigzag central narrow groove on the tire equator with a plurality of zigzag peaks and a plurality of central lug grooves each extending axially inwardly from one of the central main grooves beyond the central narrow groove and having an end within the central portion; and
   one of the central lug grooves comprising a first portion that extends from the central main groove to one of the zigzag peaks of the central narrow groove with an inclination with respect to an axial direction of the tire and a second portion that extends from the zigzag peak to the end with an opposite inclination to the first portion.

2. The pneumatic tire according to claim 1,
   wherein the central lug grooves comprise a first central lug groove extending from one of the central main grooves and a second central lug groove extending from the other one of the central main grooves, and the first central lug groove and the second central lug groove are arranged alternately in a circumferential direction of the tire.

3. The pneumatic tire according to claim 2,
   wherein the first portion has a width increasing axially outwardly and an angle of from 15 to 21 degrees with respect to the axial direction of the tire.

4. The pneumatic tire according to claim 2,
   wherein the first portion has a width at its axially outer end in a range of from 1.10 to 1.20 times of a width at its axially inner end.

5. The pneumatic tire according to claim 2,
   wherein each of the central lug grooves has a width in a range of from 5% to 7% of a pitch of the central lug grooves and a depth in a range of from 30% to 45% of a depth of the central main grooves.

6. The pneumatic tire according to claim 2,
   wherein the central narrow groove has an angle of from 80 to 85 degrees with respect to the axial direction of the tire, a width in a range of from 5% to 9% of a maximum width of the central portion, and a depth in a range of from 30% to 45% of a depth of there central main grooves.

7. The pneumatic tire according to claim 1,
   wherein the first portion has a width increasing axially outwardly and an angle of from 15 to 21 degrees with respect to the axial direction of the tire.

8. The pneumatic tire according to claim 7,
   wherein the first portion has a width at its axially outer end in a range of from 1.10 to 1.20 times of a width at its axially inner end.

9. The pneumatic tire according to claim 7,
   wherein each of the central lug grooves has a width in a range of from 5% to 7% of a pitch of the central lug grooves and a depth in a range of from 30% to 45% of a depth of the central main grooves.

10. The pneumatic tire according to claim 7,
    wherein the central narrow groove has an angle of from 80 to 85 degrees with respect to the axial direction of the tire, a width in a range of from 5% to 9% of a maximum width of the central portion, and a depth in a range of from 30% to 45% of a depth of there central main grooves.

11. The pneumatic tire according to claim 1,
    wherein the first portion has a width at its axially outer end in a range of from 1.10 to 1.20 times of a width at its axially inner end.

12. The pneumatic tire according to claim 11,
    wherein each of the central lug grooves has a width in a range of from 5% to 7% of a pitch of the central lug grooves and a depth in a range of from 30% to 45% of a depth of the central main grooves.

13. The pneumatic tire according to claim 11,
    wherein the central narrow groove has an angle of from 80 to 85 degrees with respect to the axial direction of the tire, a width in a range of from 5% to 9% of a maximum width of the central portion, and a depth in a range of from 30% to 45% of a depth of there central main grooves.

14. The pneumatic tire according to claim 1, wherein each of the central lug grooves has a width in a range of from 5% to 7% of a pitch of the central lug grooves and a depth in a range of from 30% to 45% of a depth of the central main grooves.

15. The pneumatic tire according to claim 1, wherein the central narrow groove has an angle of from 80 to 85 degrees with respect to the axial direction of the tire, a width in a range of from 5% to 9% of a maximum width of the central portion, and a depth in a range of from 30% to 45% of a depth of there central main grooves.

16. The pneumatic tire according to claim 1, wherein each of the central main grooves extends in a zigzag manner in a circumferential direction of the tire.

17. The pneumatic tire according to claim 1, wherein the central portion has a pair of circumferentially extending edges on its both sides, and an axially maximum width between the edges is in a range of from 15% to 21% of a tread width.

18. The pneumatic tire according to claim 17, wherein the central portion comprises a maximum portion that has an axially maximum length measure from the tire equator to one of the edges, and a minimum portion that has an axially minimum length measured from the tire equator to the above mentioned edge, and the maximum length is in a range of from 1.10 to 1.16 times of the minimum length.

19. The pneumatic tire according to claim 1, wherein the central portion is provided with a sipe having a depth in a range of from 65% to 75% of a depth of the central main grooves.

20. The pneumatic tire according to claim 1, wherein a land ratio of the tread portion is in a range of from 65% to 70%, where the land ratio is defined as a ratio of a total area of a contacting surface of a land portion of the tread portion to a total area of the tread portion.

* * * * *